(12) United States Patent
Crompton

(10) Patent No.: US 12,518,059 B2
(45) Date of Patent: Jan. 6, 2026

(54) DEVICE AND METHOD TO CONTROL ACCESS TO PROTECTED FUNCTIONALITY OF APPLICATIONS

(71) Applicant: Forghetti Limited, Andover (GB)

(72) Inventor: Michael Crompton, Stockbridge (GB)

(*) Notice: Subject to any disclaimer, the term of this patent is extended or adjusted under 35 U.S.C. 154(b) by 457 days.

(21) Appl. No.: 17/413,530

(22) PCT Filed: Dec. 2, 2019

(86) PCT No.: PCT/IB2019/060363
§ 371 (c)(1),
(2) Date: Jun. 11, 2021

(87) PCT Pub. No.: WO2020/128693
PCT Pub. Date: Jun. 25, 2020

(65) Prior Publication Data
US 2022/0058280 A1    Feb. 24, 2022

(30) Foreign Application Priority Data
Dec. 21, 2018 (GB) .................... 1821114
Mar. 22, 2019 (GB) .................... 1903977

(51) Int. Cl.
*G06F 21/62* (2013.01)
*G06F 21/32* (2013.01)
(Continued)

(52) U.S. Cl.
CPC ............ *G06F 21/629* (2013.01); *G06F 21/32* (2013.01); *G06F 21/46* (2013.01); *H04L 63/0428* (2013.01)

(58) Field of Classification Search
CPC ........ G06F 21/629; G06F 21/32; G06F 21/46; G06F 21/36; G06F 21/45; G06F 21/121;
(Continued)

(56) References Cited

U.S. PATENT DOCUMENTS 10,187,374 B2 * 1/2019 Brannon ............. H04L 63/0815
10,523,716 B1 * 12/2019 Stickle .................... H04L 41/28
(Continued)

OTHER PUBLICATIONS

Combined Search and Examination Report under Section 17 and 18(3) issued in GB Application No. GB1903977.5 on Sep. 13, 2019, 6 pages.
(Continued)

*Primary Examiner* — Taghi T Arani
*Assistant Examiner* — Blake I Narramore
(74) *Attorney, Agent, or Firm* — RC Trademark Company

(57) ABSTRACT

There is provided computing device (100) including user interface (102, 200, 300, 400, 500, 600, 700) and memory (104), storing plurality of applications executable on computing device, each of applications requiring entry of password; password generation and management system (106) for managing access to plurality of applications; the system being operable initially to generate first password for first application based on user selection and inputting of security identifier; generate second password for second application based on user selection and reiteration of security identifier; and generate unique password other applications based on their individual selection and distinct reinputting of the security identifier; and, at subsequent stage, password generation and management system, being operable to: provide respective password for access to protected functionality of particular application in response to user selecting particular application and further inputting of security identifier, without comparing security identifier whose input resulted in original generation of respective password.

18 Claims, 9 Drawing Sheets

(51) Int. Cl.
*G06F 21/46* (2013.01)
*H04L 9/40* (2022.01)

(58) Field of Classification Search
CPC . G06F 21/604; H04L 63/0428; H04L 9/0866; H04L 9/0894; H04L 63/083; H04L 63/0853; H04L 63/0861
See application file for complete search history.

(56) References Cited

U.S. PATENT DOCUMENTS

| | | |
|---|---|---|
| 2003/0131266 A1 | 7/2003 | Best et al. |
| 2008/0098222 A1* | 4/2008 | Zilberman ............... G06F 21/83 713/170 |
| 2010/0146269 A1* | 6/2010 | Baskaran ................ G06F 21/10 726/28 |
| 2010/0306841 A1 | 12/2010 | Wang |
| 2013/0013931 A1* | 1/2013 | O'Hare ................. H04L 9/3231 713/189 |
| 2015/0128234 A1 | 5/2015 | Xavier et al. |
| 2015/0332029 A1* | 11/2015 | Coxe ....................... G06F 21/31 726/5 |
| 2016/0119312 A1* | 4/2016 | Armstrong ............ H04L 9/0863 713/171 |
| 2017/0011213 A1* | 1/2017 | Cavanagh ................ H04L 67/02 |
| 2017/0019396 A1* | 1/2017 | Bettenburg ............. G06F 21/34 |
| 2018/0248689 A1 | 8/2018 | Hu et al. |
| 2018/0332023 A1* | 11/2018 | Chari ....................... H04L 63/20 |
| 2019/0050557 A1* | 2/2019 | Martin .................... H04L 63/08 |
| 2019/0116172 A1* | 4/2019 | Caldwell ............... H04L 67/306 |
| 2019/0123898 A1* | 4/2019 | Martín Rodríguez .... H04L 9/12 |
| 2019/0222420 A1* | 7/2019 | Maezawa ................ H04L 9/083 |
| 2019/0332691 A1* | 10/2019 | Beadles ............. G06Q 20/3829 |
| 2019/0332757 A1* | 10/2019 | Chen ...................... G06V 40/45 |
| 2019/0372989 A1* | 12/2019 | Shultz .................... G06F 21/45 |
| 2020/0012776 A1* | 1/2020 | Deluca .................. G06F 21/316 |
| 2020/0110867 A1* | 4/2020 | Seo .......................... G06F 21/36 |
| 2020/0169886 A1* | 5/2020 | Bhatt .................... H04W 12/08 |

OTHER PUBLICATIONS

Notification of Transmittal of the International Search Report and Written Opinion of the International Searching Authority mailed in PCT Application No. PCT/IB2019/060363 on Mar. 13, 2020, 11 pages.

* cited by examiner

DEVICE AND METHOD TO CONTROL ACCESS TO PROTECTED FUNCTIONALITY OF APPLICATIONS

TECHNICAL FIELD

The present invention relates generally to information systems, and more specifically, to computing devices comprising systems for managing access to applications, and to methods of controlling access to protected functionality of applications on computing devices.

BACKGROUND

The Internet is spreading rapidly and along with it the use of electronic products and services namely utility applications, emails, web searches, Internet video calls and the like have witnessed an increasing user base. Generally, users of these products and services prefer to have a personalized access to such platforms. As a result, the user builds a personal user account on these platforms and secures privacy by setting an access key for entry. Commonly, the access key is in the form of a password or passcode created by the user to prevent unauthorised access to the user account.

However, a password system involves multiple problems. For example, different platforms accessed by the users compel the user to create separate user accounts and passwords for each platform. However, with increasing user accounts and password, the user struggles to remember or recall complex passwords, accurately. Thus, the user resorts to setting up weak passwords thereby, compromising security. Furthermore, users also tend to use the same password for multiple user accounts, making the user vulnerable to multiple account hacking. Additionally, to cope with the struggle to remember and recall complex passwords, the user notes the passwords safely in a document, such as a book, a digital document, or the like. Such arrangement can be hacked or accessed by simply copying or stealing information available therein. Moreover, with the development of technology, techniques have been developed wherein the user is given access to their list of passwords, saved in a centralized device, that is protected by a master password. However, such techniques are susceptible to brute force attacks.

Therefore, in light of the foregoing discussion, there exists a need to overcome the aforementioned drawbacks associated with conventional methods of password management for user accounts.

SUMMARY

Embodiments of the present invention seek to provide a method of controlling access to protected functionality of applications on a computing device, the computing device comprising a user interface and a memory.

In a first aspect, the present invention provides a computing device including a user interface and a memory, the memory storing:
  a plurality of applications executable on the computing device, each of the applications requiring entry of a respective password for access to protected functionality of the respective application;
  a password generation and management system for managing access to the plurality of applications;
  wherein the password generation and management system being operable initially to:
    generate a first password for a first application of the plurality of applications based on a user selection of the first application and the inputting of a security identifier by a user;
    generate a second password for a second application of the plurality of applications based on a user selection of the second application and a reiteration of the security identifier obtained as the result of a reinputting of the security identifier by the user through the user interface, the first and second passwords being different from each other; and
    generate a unique password for each of the other applications of the plurality of applications based on their individual selection and a distinct reinputting of the security identifier for each password generation event; and, at a subsequent stage,
  and wherein the password generation and management system, after a given password has been provided to a particular application to make that given password the respective password for that particular application, being operable to:
    provide the respective password for access to the protected functionality of the particular application in response to the user selecting the particular application and a further inputting of the security identifier, without comparing the security identifier whose input resulted in the original generation of the respective password for that particular application with the security identifier which the user provided by the further inputting.

In a second aspect, the present invention provides a computing device having a control processor configured to access executable instructions that cause the control processor to control operations of the computing device, the device including a user interface and a memory, the memory storing:
  the executable instructions;
  a password generation and management system;
  a plurality of applications executable on the computing device, each of the applications requiring entry of a respective password for access to protected functionality of the respective application;
  and wherein the password generation and management system is configured in an initial stage to:
  generate a first password for a first application of the plurality of applications based on a user selection of the first application and the inputting of a security identifier input by the user through the user interface, the first password being provided to the first application to become the respective password for access to the protected functionality of the first application;
  generate a second password for a second application of the plurality of applications based on a user selection of the second application and a reiteration of the security identifier obtained as the result of a reinputting of the identifier by the user through the user interface, the second password being provided to the second application to become the respective password for access to the protected functionality of the second application, the first and second passwords being different from each other;
  and the computing device is configured at a subsequent stage to provide the user with access to the protected functionality of the first application as a consequence of:
  the user selecting the first application and further inputting the security identifier through the user interface;

the password generation and management system generating afresh a password for the first application based on the user's selecting the first application and the further inputting of the security identifier; and the provision of the freshly generated password to the first application;

wherein the password generation and management system is configured to generate a password afresh for the first application at the further inputting stage whether or not the security identifier input by the user at the further inputting stage corresponds to that entered at the initial stage, but access to the protected functionality of the first application is only given in the event that the freshly generated password provided to the first application matches the first password, the freshly generated password provided to the first application matching the first password if the security identifier input by the user at the further inputting stage does correspond to that entered at the initial stage.

The following options apply equally to both the first and second aspects, unless it is clear from the context that this is not the case.

Optionally, the password generation and management system is configured at the subsequent stage to provide the password to the first application directly.

Optionally, the password generation and management system is also configured at the initial stage to provide the passwords to the first and second applications directly.

Optionally, the password generation and management system is configured at the initial stage to make the passwords available to the user for the user to copy to the respective application.

Optionally, the password generation and management system is also configured at the subsequent stage to make the password available to the user for the user to copy to the first application.

Optionally, the password generation and management system is configured to cause the device to display, on a display of the device, a first image, and the inputting and reinputting of the security identifier involve the user interacting with the first image.

Optionally, the password generation and management system is further configured, in response to the user interacting with the first image, to cause the device to display, on the display of the device, a second image, and the inputting and reinputting of the security identifier also involve the user interacting with the second image.

Optionally, the first and second images are the same.

Optionally, the first or second image includes an array of items, or a lattice.

Optionally, the password generation and management system is configured to recognise one or more patterns produced on the first or second image as the security identifier or as an element of the security identifier.

Optionally, the password generation and management system is configured to accept a fingerprint, thumbprint, an iris scan, or other biometric input as the security identifier or as an element of the security identifier.

Optionally, the respective password of each of the plurality of applications has been generated by the password generation and management system of the device.

Optionally, the password generation and management system of the device is configured to cooperate with at least one second computing device in order to generate the passwords.

Optionally, the password generation and management system is configured to cause the computing device to transmit to said at least one second computing device an encrypted message containing one or more parameters derived from the security identifier for the purpose of generating the passwords.

Optionally, the security identifier is a multi-level pattern key.

In a third aspect, the present invention provides a method of controlling access to protected functionality of applications on a computing device, the computing device comprising a user interface and a memory, the memory storing:

a plurality of applications executable on the computing device, each of the applications requiring entry of a respective password for access to protected functionality of the respective application;

a password generation and management system for managing password access to the plurality of applications;

the method comprising an initial stage of:
  receiving a user selection of a first application of the plurality of applications;
  receiving a security identifier input by the user through the user interface;
  generating, using the password generation and management system, a first password for the first application based on the user selection of the first application and the inputting of the security identifier;
  providing the first password to the first application to make the first password the respective password for the first application;
  generating, using the password generation and management system, an nth password for an nth application of the plurality of applications based on receiving a user selection of the nth application and a reiteration of the security identifier obtained as the result of a reinputting of the security identifier by the user through the user interface, the first and nth passwords being different from each other;
  providing the nth password to the nth application to make the nth password the respective password for the nth application;

and, at a subsequent stage, after a given password has been provided to a particular application to make that given password the respective password for that particular application, the method further comprising subsequently:
  receiving a user selection of the particular application;
  receiving the security identifier as a consequence of a further inputting by the user of the security identifier; and,
  providing the respective password for access to the protected functionality of the particular application without comparing the security identifier whose input resulted in the original generation of the respective password for that particular application with the security identifier which the user provided by the further inputting.

In a fourth aspect, the present invention provides a method of controlling access to protected functionality of applications on a computing device, the computing device comprising a user interface, a control processor configured to access executable instructions that cause the control processor to control operations of the computing device, and a memory, the memory storing:
  the executable instructions;
  a password generation and management system;
  a plurality of applications executable on the computing device, each of the applications requiring entry of a respective password for access to protected functionality of the respective application; the method comprising an initial stage of:
receiving a user selection of the first application;
receiving a security identifier input by the user through the user interface;
generating, using the password generation and management system, a first password for a first application of the plurality of applications based on the user selection of the first application and the inputting of the security identifier;
supplying the first password to the first application to become the respective password for access to the protected functionality of the first application;
receiving a user selection of the second application;
receiving a second iteration of the security identifier as the result of a reinputting of the identifier by the user through the user interface;
generating, using the password generation and management system, a second password for a second application of the plurality of applications based on the user selection of the second application and the reinputting of the security identifier;
supplying the second password to the second application to become the respective password for access to the protected functionality of the second application, the first and second passwords being different from each other;
the method further comprising subsequently:
providing the user with access to the protected functionality of the first application as a consequence of the user:
selecting the first application;
further inputting the security identifier through the user interface; and
generating afresh, using the password generation and management system, a password for the first application based on the user's selecting the first application and the further inputting of the security identifier, without determining whether or not the security identifier input by the user at the further inputting stage corresponds to that entered at the initial stage;
providing the freshly generated password to the first application; and providing access to the protected functionality of the first application only if the freshly generated password provided to the first application matches the first password, the freshly generated password provided to the first application matching the first password if the security identifier input by the user at the further inputting stage does correspond to that entered at the initial stage.

The following options apply equally to both the third and fourth aspects, unless the context clearly indicates otherwise.

Optionally, in the method, the password generation and management system is configured for providing at the subsequent stage the password to the first application directly.

Optionally, in the method, the password generation and management system is configured for providing at the initial stage the passwords to the first and second applications directly.

Optionally, in the method, at the initial stage the password generation and management system is configured for making available the passwords to the user for the user to copy to the respective application.

Optionally, in the method, at the subsequent stage the password generation and management system is configured for making the password available to the user for the user to copy to the first application.

Optionally, in the method, the password generation and management system is configured for causing the device to display, on a display of the device, a first image, and wherein the inputting and re-inputting of the security identifier involve the user interacting with the first image.

Optionally, in the method, the password generation and management system is configured for causing, in response to the user interacting with the first image, the device to display, on the display of the device, a second image, and wherein the inputting and re-inputting of the security identifier also involve the user interacting with the second image.

Optionally, in the method, the first and second images are the same.

Optionally, in the method, the first or second image includes an array of items, or a lattice.

Optionally, the method further comprises recognising using the password generation and management system one or more patterns produced on the first or second image as the security identifier or as an element of the security identifier.

Optionally, in the method, the password generation and management system is configured for accepting a fingerprint, thumbprint, an iris scan, or other biometric input as the security identifier or as an element of the security identifier.

Optionally, the method further comprises generating the respective password of each of the plurality of applications with the password generation and management system.

Optionally, in the method, the password generation and management system of the device is configured for cooperating with at least one second computing device in order to generate the passwords.

Optionally, the method further comprises transmitting to said at least one second computing device an encrypted message containing one or more parameters derived from the security identifier for the purpose of generating the passwords.

Optionally, in the method, the security identifier is a multi-level pattern key.

In a fifth aspect, the present invention provides a password generation and management system application for loading onto a computing device having a user interface and a plurality of applications executable on the computing device, each of the applications requiring entry of a respective password for access to protected functionality of the respective application, the password generation and management system application, when loaded onto the computing device, being configured in an initial stage to:
generate a first password for a first application of the plurality of applications based on a user selection of the first application and the inputting of a security identifier input by the user through the user interface, the first password becoming the respective password for access to the protected functionality of the first application;
generate a second password for a second application of the plurality of applications based on a user selection of the second application and a reiteration of the security identifier obtained as the result of a reinputting of the identifier by the user through the user interface, the second password becoming the respective password for access to the protected functionality of the second application, the first and second passwords being different from each other;
and at a subsequent stage to provide the user with access to the protected functionality of the first application as a consequence of: the user selecting the first application and further inputting the security identifier through the user interface;

the password generation and management system application generating afresh a password for the first application based on the user's selecting the first application and the further inputting of the security identifier; and the provision of the freshly generated password to the first application;

wherein the password generation and management system application is further configured to generate a password afresh for the first application at the further inputting stage whether or not the security identifier input by the user at the further inputting stage corresponds to that entered at the initial stage, but access to the protected functionality of the first application is only given in the event that the freshly generated password provided to the first application matches the first password.

In a sixth aspect, the present invention provides a password generation and management system application for loading onto a computing device having a user interface and a plurality of applications executable on the computing device, each of the applications requiring entry of a respective password for access to protected functionality of the respective application, the password generation and management system application, when loaded onto the computing device, being configured in an initial stage to:

generate a first password for a first application of the plurality of applications based on a user selection of the first application and the inputting of a security identifier input by the user through the user interface, the first password becoming the respective password for access to the protected functionality of the first application;

generate a second password for a second application of the plurality of applications based on a user selection of the second application and a reiteration of the security identifier obtained as the result of a reinputting of the identifier by the user through the user interface, the second password becoming the respective password for access to the protected functionality of the second application, the first and second passwords being different from each other;

and at a subsequent stage to provide the user with access to the protected functionality of the first application as a consequence of:

the user selecting the first application and further inputting the security identifier through the user interface;

the password generation and management system application generating afresh a password for the first application based on the user's selecting the first application and the further inputting of the security identifier; and the provision of the freshly generated password to the first application;

wherein the password generation and management system application is further configured to generate a password afresh for the first application at the further inputting stage whether or not the security identifier input by the user at the further inputting stage corresponds to that entered at the initial stage, but access to the protected functionality of the first application is only given in the event that the freshly generated password provided to the first application matches the first password, the freshly generated password provided to the first application matching the first password if the security identifier input by the user at the further inputting stage does correspond to that entered at the initial stage.

In a seventh aspect, the present invention provides a password generation and management system for managing password access to a plurality of applications executable on a computing device, each of the applications requiring entry of a respective password for access to protected functionality of the respective application; the password generation and management system being operable to: generate a first password for a first application of the plurality of applications based on a user selection of the first application and the inputting of a security identifier by a user; generate a second password for a second application of the plurality of applications based on a user selection of the second application and a reiteration of the security identifier obtained as the result of a reinputting of the identifier by the user through the user interface, the first and second passwords being different from each other; and similarly to generate a unique password for each of the other applications of the plurality of applications based on their individual selection and a distinct reinputting of the security identifier for each password generation event; and after a given password has been provided to a particular application to make that given password the respective password for that particular application, the password generation and management system being operable to: provide the respective password for access to the protected functionality of the particular application in response to the user selecting the particular application and a further inputting of the security identifier, without comparing the security identifier whose input resulted in the original generation of the respective password for that particular application with the security identifier which the user provided by the further inputting.

Embodiments of the present invention substantially eliminate or at least partially address the aforementioned problems in the prior art, and provide the user secure access to different applications without the hassle of remembering complex passwords. Furthermore, they protect the user from brute force attacks thereby maintaining confidentiality of the user account. Beneficially, the unique access code is generated using an efficient password generation and management system thus maintaining high level of secrecy at all times. Specifically, it ensures verified user access each time since the user password is not physically stored by the system which can be stolen or copied for hacking purpose.

Additional aspects, advantages, features and objects of the present invention will be made apparent from the drawings and the detailed description of the illustrative embodiments construed in conjunction with the appended claims.

It will be appreciated that features of the present disclosure are susceptible to being combined in various combinations without departing from the scope of the present invention as defined by the appended claims.

BRIEF DESCRIPTION OF THE DRAWINGS

The summary above, as well as the following detailed description of illustrative embodiments, will be better understood when read in conjunction with the appended drawings. For the purpose of illustrating the present disclosure, exemplary constructions of embodiments of the invention are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present invention will now be described, by way of example only, with reference to the following diagrams wherein.

Figure 1:
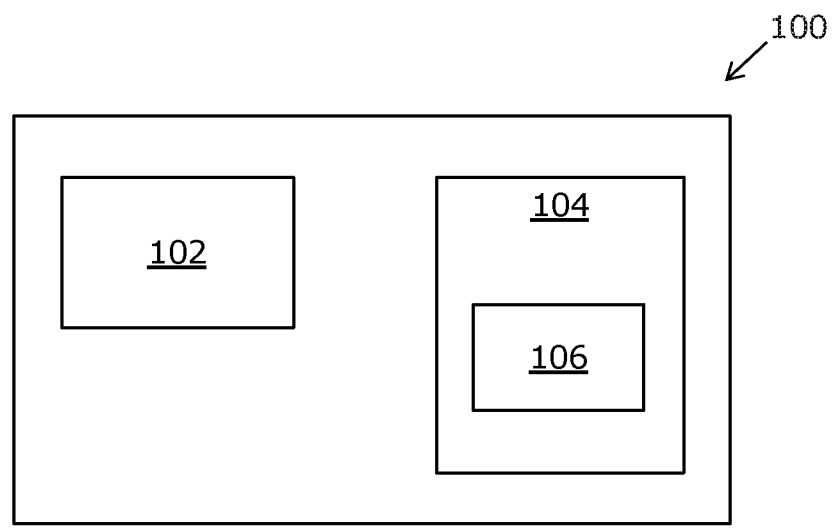
FIG. 1 is a block diagram of a computing device, in accordance with an embodiment of the present invention.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present invention and ways in which they can be implemented. Although some modes of carrying out the present invention have been disclosed, those skilled in the art will recognize that other embodiments for carrying out or practicing the present invention are also possible.

The present disclosure provides a system for managing information required to generate passwords for accessing applications. Optionally, the system includes a collection of one or more programmable and/or non-programmable components that are configured to perform one or more steps to manage information required to generate passwords. Furthermore, the one or more programmable and/or non-programmable components are interconnected therein. Moreover, the one or more programmable and/or non-programmable components are operable to form a computing environment, which enables the system to operate as a cloud based, algorithm driven, platform agnostic driven by a multi-level pattern key which generates passwords for accessing applications by individual users. Furthermore, the system is configured to generate the password upon receiving an access request (for accessing an application) from a user of the system without storing data related to the password in any centralized location or on a device. Moreover, the data related to the password can be a form of computerized information that can be used to create a complex password for accessing an application.

The present disclosure provides the computing device including the user interface and the memory. Specifically, the computing device is an electronic device associated with (or used by) the user for performing specific tasks. It will be appreciated that the term "user", as used herein, relates to a person (i.e., a human being), and/or a virtual personal assistant (an autonomous program or a bot) using the computing device to perform the tasks. Furthermore, the computing device is intended to be broadly interpreted to include any electronic device that is used for voice and/or data communication over a wireless communication network. Optionally, the computing device encompasses a variety of different types of mobile stations, subscriber stations or, more generally, communication devices, including examples such as a combination of a data card inserted in a laptop. Examples of the computing device include, but are not limited to, cellular phones, personal digital assistants (PDAs), handheld devices, laptop computers, personal computers, etc. Optionally, the computing device includes a casing, a memory, a processing module, a network interface card, a microphone, a speaker, a keypad, and a display module.

Typically, the computing device includes a control processor configured to access executable instructions that cause the control processor to control operations of the computing device. The control processor is a computational element that is operable to respond to and process instructions that are received or generated at the computing device. Optionally, the control processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the control processor can include one or more individual processors, processing devices and various elements associated with a processing device that may be shared by other processing devices. Additionally, the one or more individual processors, processing devices and elements are arranged in various architectures for responding to and processing the instructions received or generated at the computing device.

Throughout the present disclosure, the term "user interface" may relate to a human machine interface (HMI) to enable the user to provide an input to the computing device and further establish an interaction with the computing device. Optionally, the aforesaid input provided by the user may be a touch input, a gesture input, a voice input, or an input sensed by sensors (such as motion sensors). In an example, the user may have an interaction on a graphical user interface by providing a gesture input. In another example, the user may have an interaction on a touch user interface by providing a touch input and/or a braille input. Furthermore, the user interface may comprise a structured or an unstructured set of user interface elements. Optionally, the user interface rendered on the display screen is generated by a collection or set of instructions executable by the computing device. Additionally, the user interface is operable to interact with the user to convey graphical and/or textual information and receive input from the user. Specifically, the user interface used herein is a graphical user interface and/or a touch user interface. Furthermore, the user interface elements refer to visual objects that have a size and position in user interface. The user interface element may be visible, and/or felt by touching though there may be times when the user interface element is hidden. A user interface control is considered to be the user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like. In an example, user interface comprises user interface elements displaying name and icon of a software program accessed by a user on the user interface, a date and time, previous versions of the software program. Furthermore, the memory of the computing device relates to a volatile or persistent medium, such as an electrical circuit, magnetic disk, virtual memory or optical disk, in which a computer can store data or software for any duration. Optionally, the memory is non-volatile mass storage such as physical storage media. Optionally, the executable instructions generate the user interface displayed on the computing device.

The memory is configured for storing the plurality of applications executable on the computing device. The plurality of applications includes a plurality of application programming interfaces (APIs). Throughout the present disclosure, the term "application programming interface (API)" relates to a set of functions that can be used to call from one application program access features of one or more application programs. In an instance, the application programming interface calls a feature of a first application program which is directly associated with the application programming interface. In another instance, the application programming interface calls a given feature of a second application program, wherein the application programming interface comprises source path of the given feature of the second application program. Furthermore, an application programming interface (API) is a software interface that includes one or more routines, data structures, object classes, and/or protocols that support the interaction of an archiving platform and a storage system. An application programming interface (API), for example, includes building blocks for enabling the building of a software application that is consistent with a particular application or operating environment. An API can be specified in terms of a programming language that may be compiled at a building time of application. Furthermore, each of the applications provides access to a web-service accessible over the Internet, via a standard interface, which may dynamically interact with applications or other web-services by using communication protocols, such as those based on XML, BEEP, SOAP, Hessian, JSON-RPC and the like, and may do so regardless of which operating system and programming language in use. In an example, a web-service may be a website available for access to users through the Internet for transacting a cryptocurrency. In another example, a web-service may be a web wallet account associated to cryptographic keys. The cryptographic keys refer to a pair of keys that enable access to the web-service by way of encryption and decryption.

Furthermore, each of the applications requires entry of the respective password for access to protected functionality of the respective application. Furthermore, the password for accessing the protected functionality of the respective application refers to a code that is entered via the user interface to unlock a specific function or all functions of the application that are locked to prevent from viewing or using the functions of the application. Optionally, functions may include essential and non-essential functions such that essential functions comprise information critical to users which cannot be shared without authorization by the user. Furthermore, the essential functions are protected from access by any unauthorized user. Examples of essential functions may include contact information of the user, location of the user, chat history of the user and the like, whereas non-essential functions may include viewing contacts of the user, a time the application was last used, internet data consumed by the user and the like. The protected functions of applications are locked to prevent any unauthorized user from accessing the protected functions of the applications. For example, any unauthorized user is to be prevented from accessing and using bank account information of an authorized user available on a banking related application for transferring funds.

Optionally, the password is a complex code in the form of letters, numbers and symbols, and a combination thereof. Examples of password are 546891, abcdef, PQRST, JF123T, *&^( ) PW3#a and the like. Furthermore, the password may be constrained to be of a specific length, such as the password may be of 8 characters. Optionally, the users can provide user preference via the user interface for the generation of the password. Optionally, the user can specify a number of characters, type of characters to be included in the password. Furthermore, the generation of the password includes employing one or more software algorithms on one or more digital elements to generate the password (as a response) which is persistent and linked to the multi-layered pattern entered by the user. It will be appreciated that, the generated password may be displayed to the user on the computing device. The functionality of any given application of the plurality of applications refers to one or more activities that the given application enables the user to perform. Examples of such activities may be uploading photos, posting text, transferring funds and the like. In an exemplary scenario, the given application accessed by a user may be a social networking application. In such exemplary scenario, a password generation algorithm may be employed for generating the password. The generated password protects the functions of the social networking application which are essential to the users. The function essential to the users may be communications made with other users on the social networking application, a profile setting of the user on the social networking application, an online order placed by the user, a transaction history of the funds transferred by the user and the like.

Optionally, the memory is configured for storing the executable instructions accessed by the control processor. The executable instructions are any collection or set of instructions executable by the control processor so as to configure the control processor to perform a task of controlling access to protected functionality of applications on the computing device. The control processor is configured to access executable instructions that cause the control processor to control operations of the computing device. Furthermore, the executable instructions are intended to encompass instructions stored in storage medium such as RAM, a hard disk, optical disk, or so forth, and is also intended to encompass so-called "firmware" that is software stored on a ROM or so forth. Optionally, the executable instructions refer to a software application. Such executable instructions are organized in various ways, for example the executable instructions include software components organized as libraries, Internet-based programs stored on a remote server or so forth, source code, interpretive code, object code, directly executable code, and so forth. It may be appreciated that the executable instructions may invoke system-level code or calls to other software residing on a server or other location to perform certain functions. Furthermore, the executable instructions can be pre-configured and pre-integrated with an operating system, building a software appliance.

The memory is configured for storing the password generation and management system for managing password access to the plurality of applications. The password generation and management system include a collection of one or more programmable and/or non-programmable components that are configured to perform one or more steps to manage information required to generate and manage passwords. Furthermore, the one or more programmable and/or non-programmable components are interconnected therein. Moreover, the one or more programmable and/or non-programmable components are operable to form a computing environment, which enables the password generation and management system to operate as a cloud based, algorithm driven, platform agnostic driven by the multi-level pattern key which generates passwords for accessing plurality of application such as third-party applications. Furthermore, the aforesaid system is configured to generate the password upon receiving an access request (for accessing the third-party applications) from a user of the aforesaid system without storing data related to the password in any centralized location or a device. Moreover, the data related to the password may exist in form of computerized information that may be used to create a complex password for accessing plurality of applications. Furthermore, the aforesaid system can be implemented in various computing environments. Optionally, the aforesaid system can be implemented in a distributed computing environment that refers to an interconnected network of a collection of communication capable devices (such as smart phones, palmtops and the like) and computers (local and remote) configured to share one or more computational resources to perform distributed processing. Optionally, the distributed computing environment enables a network-based computing style that neither excludes nor inherently depends on centralized control points. Optionally the distributed computing environment includes a cloud environment having a virtualized computing platform in which the user can be provided access to computing resources without knowledge, ownership, or physical access to the computer resources itself. The hardware, software, and capabilities of the components of a distributed computing environment or cloud environment may be offered to users as objects or services, such as the plurality of applications.

In an embodiment, a password generation and management system may be implemented as a software application such that the software application may be stored on the computing device by loading the aforesaid system onto the computing device from a distributer of the software application. In such a case, the aforesaid system may be referred to as a password generation and management system application.

The password generation and management system is operable initially to generate the first password for the first application of the plurality of applications based on the user selection of the first application and the inputting of the security identifier by the user. The initial stage provides the user with the user interface including one or more user interface elements wherein the user selects the first application of the plurality of applications that the user prefers to access via user selection. In an example, the user interface comprises a grid of the plurality of applications having some of the plurality of applications displayed on the user interface wherein the user can scroll on the user interface to view rest of the plurality of applications. In such a case, the user can select the first application on the grid of the plurality of applications. Thereafter, the user interface prompts the user to enter the security identifier that is a preferred access code via the one or more user interface elements that the password generation and management system uses to generate a first password that is provided to the first application of the plurality of applications to become the respective password for access to the protected functionality of the first application.

In operation at the initial stage includes an event wherein the password generation and management system is used by the user via the computing device for the first time. For example, an initial stage may refer to the condition wherein the user downloads the password generation and management system from an online distributor of such aforesaid system such as Play Store®, App Store®, Microsoft Store® and the like, registers itself by providing one or more user details and/or preference and identifies the plurality of applications executable on the computing device that the user prefers to access via the password generation and management system. In such example, at the initial stage the password generation and management system may be used to access a specific application, wherein a password may have been already defined by the user for accessing the specific application. Furthermore, in such instance, the password generation and management system may generate a unique password for the specific application, wherein the unique password replaces the already defined password for the specific application. In other words, the password generation and management system is configured to reset the password for the specific application in the event wherein the user accesses the specific application via the password generation and management system for first time.

The password generation and management system is operable to generate the first password for the first application of the plurality of applications by employing a password generation algorithm which uses the security identifier entered by the user and characteristics associated with the first application. Examples of characteristics include a version of the application, software instructions used in the application, software coding language used in the application. In an example, a random code generator is used for generating the first password for the first application. In an exemplary implementation, a user selects a fitness application named 'ABC' among a plurality of fitness applications (such as 'ABC', 'PQR', 'LMNO', 'ZON', 'xyz') displayed on the user interface. In such a case, upon the selection of the 'ABC' fitness application the user inputs the security identifier upon receiving a prompt on the user interface. Furthermore, the password generation and management system generate a password such as &*ABYN based on the input of the security identifier.

Optionally, the password generation and management system is configured to accept a fingerprint, thumbprint, an iris scan, or other biometric input as the security identifier or as an element of the security identifier. The security identifier may therefore include inputs and/or interactions that are provided by a user in a tactile manner, such as through physical interaction with one or more media, elements, and/or components included in the computing device. Optionally, the security identifier is of user's choice, generally the security identifier is provided during a registration of the computing device with the system. It will be appreciated that the user is authenticated using a third-party authentication service, such as Google's Cloud authentication service. The authentication of the user enables in preventing unauthorised access of the computing device to illegitimate users such as hackers for protection against cybercrimes such as data theft. Furthermore, the third-party authentication services assign user authenticity code to authenticated users accessing the application, further when the application is used by aforesaid user, the access to the application is given based on the user authenticity code provided by the user. The fingerprint, thumbprint may be collected optically using an optical sensor or sensors. Other biometric inputs such as keystroke dynamics, and signature may be collected using a touch-sensitive interface of the computing device. In an example, a touch-sensitive interface such as a touchscreen keyboard enables collection of keystroke dynamics comprising speed of typing, variation in speed while switching between keys on the touchscreen keyboard, time duration of pressing a key on the touchscreen keyboard. In another example, a touch-sensitive interface enables collection of signatures of a user. Furthermore, the touch-sensitive interface may capture a pattern input by the user. Here, "touch-sensitive interface" may refer to an interface comprising a sensor electrode arrangement configured to receive one or more communication signals (such as haptic communication signals) via a user part touching or approaching the interface, and a detector configured to detect a position of the user part, or other information such as a computer code, based on the one or more body-coupled communication signals. Furthermore, the sensor electrode arrangement may be a capacitive sensing arrangement incorporated inside the interface, which may allow contact-free sensing and protection of the sensing components. In an example, the touch-sensitive interface may be a screen of the computing device, a touch pad associated with the computing device. In such an example, a pattern may be made by the user on the screen or the touch pad of the computing device, such pattern may be captured by the sensor electrode arrangement and determined as a pattern. Subsequently, the determined pattern may be accepted as security identifier from the user. The pattern entered by the user is a personalized pattern which may comprise a multi-layered pattern. Optionally, the personalized pattern is a combination of numbers, letters, alphanumeric characters, and a movement pattern. Beneficially, the generation of the personalized pattern is a visual process, therefore the personalized pattern is convenient for the user to recall when needed.

Optionally, an iris scan can be captured by an image capturing module of the computing device. Optionally, the image capturing module can be used to capture an image of the user to determine a gesture performed by the user. The image capturing module of the computing device refers to a collection of one or more programmable and/or non-programmable components that are configured to capture one or more images of the user. Furthermore, the programmable component of the image capturing module relates to a device that includes at least one lens and image sensor to acquire a reflectance from a reflected visible light that is reflected from the planar surface, namely a face of the user. Optionally, the programmable component of the image capturing module includes a body housing, an electronic circuit, a photographic objective mounted on a body, and a connecting device operatively coupled to the electronic circuit. Furthermore, the programmable component of the image capturing module is operable to capture the one or more images of the face of the user via the photographic objective. Optionally, the programmable component of the image capturing module can be a smartphone camera. Specifically, the programmable component of the image capturing module is a built-in camera within the computing device. Furthermore, the computing device can include physical and virtual element, namely a button that enables capturing images of the user (such as the face of the user). The image captured by the image capturing module can indicate various facial gestures therein. For example, an image of the face of the user with raised eyebrows. In such an instance, the raised eyebrows may be considered as a facial gesture of the user. In such an instance, the image of the user captured by the image capturing module having the raised eyebrows may be considered as the preferred access code. Optionally, the computing device is configured to accept a security identifier in the form of a signature captured in digital form when a specific pattern is made on the touch-sensitive interface of the computing device. Furthermore, the signatures include a specific characteristic and distinctive shape or pattern that is digitalized and accepted as the security identifier for unlocking access to the system or the applications.

Optionally, the security identifier is a multi-level pattern key. The multi-level pattern key is a combination of various security identifiers such that the password generation and management system accept the various security identifiers entered by the user one after the other. In an example, the password generation and management system accept a fingerprint as an initial element of a security identifier which is followed by a signature, and which is further followed by an iris scan of the user. Generally, the biometric input is used as the security identifier by the user enabling the user to not remember and recall any complex security identifier for accessing the application. Furthermore, the biometric input protects the user from being hacked as the user need not note any complex security identifier in any document, such as a book, a digital document, or the like for remembering the security identifier.

Optionally, when the user is providing the security identifier to the password generation and management system, the security identifier is displayed on the screen in a hidden manner so that any unauthorized user is prevented from secretly viewing the security identifier input by the user. In an example, a pattern input as a security identifier is displayed on the user interface as symbols such as *, #, @ and the like. In another example, a sequence such as GYP98 input as a security identifier is displayed on the user interface as *****.

The first password is provided to the first application to become the respective password for access to the protected functionality of the first application. The password generation and management system may provide the first password to the first application for the first application to register that first password as the password needed to access the restricted functionality of that first application.

The password generation and management system is operable initially to generate the second password for the second application of the plurality of applications based on the user selection of the second application and the reiteration of the security identifier obtained as the result of the reinputting of the security identifier by the user through the user interface. Moreover, the second password is different from the first password. Furthermore, the security identifier is reinput by the user for the generation of second password may be same as the security identifier input by the user for the generation of first password. Optionally, the second password for the second application of the plurality of application may be of a similar format to that of the first password for the first application. The generation of the second password for a second application requires the reiteration of the security identifier obtained as the result of the reinputting of the security identifier by the user through the user interface. The reiteration of the security identifier means providing the security identifier for a second time. It will be appreciated that the security identifier is provided for the first time for generating the first password for the first application, and therefore, the reiteration of the security identifier as the result of a reinputting of the security identifier by the user through the user interface is similar to the initial process of inputting the security identifier for generating the first password for the first application. Optionally, the security identifier which is input by the user for the first application and the security identifier which is reinput by the user for the second application are different from each other. In an example, the security identifier which is input by the user for the first application includes a combination of iris scan of the user, and a sequence such as 14AB23, whereas the security identifier which is input by the user for the second application includes fingerprint of the user, and a sequence such as Ef258G. Additionally, the first and second passwords are different from each other. For example, the first password may be "ABC)&$074" and the second password may be "XYZ@#^962". The second password is provided to the second application to become the respective password for access to the protected functionality of the second application.

The password generation and management system is operable initially to generate the unique password for each of the other applications of the plurality of applications based on their individual selection and the distinct reinputting of the security identifier for each password generation event. It is to be understood that, the password generated for each of the other application of the plurality of applications is different for each application. In an example, the security identifier which is input by the user for a third application includes a combination of thumbprint of the user, and a sequence such as 02#5E, the security identifier which is input by the user for the fourth application includes a sequence such as P33X&T{B, the security identifier which is input by the user for the fifth application includes a fingerprint of the index finger. The unique password generated for each of the other applications is provided to respective application to become the respective password for access to the protected functionality of the other applications.

The respective password of each of the plurality of applications is generated by the password generation and management system of the device. Specifically, the password generation and management system include one or more computer programs or routines that are configured to generate respective password of each of the plurality of applications. In an example, the one or more computer programs or routines includes a random code generator that generates the respective password of each of the plurality of applications. In an example, the passwords generated are U++3I, 5TUP7KQW, PTY9$9( ), 987647, ^T for plurality of applications named 'AB1', 'PQ2', 'KOKG', 'XYZ4', and 'HY56' respectively.

Optionally, the security identifier input by the user for the first application, the security identifier reinput by the user for the second application and the security identifier distinctly reinput by the user for each of the other applications of the plurality of applications may be same. Beneficially, in such a case, effort of the user to memorize corresponding security identifier for each of the plurality of applications is reduced. It is to be understood that in such a case, the passwords generated for each of the plurality of applications are still different even though the security identifiers are same for the plurality of applications. In an example, a user can use iris scan as security identifier for each of the plurality of applications.

Optionally, the password generation and management system of the device is configured to cooperate with at least one second computing device in order to generate the passwords. The at least one second computing device refers to a structure and/or module that include programmable and/or non-programmable components configured to store, process and/or share information related to generation of the passwords. Optionally, the at least one second computing device includes any arrangement of physical or virtual computational entities capable of enhancing information to perform various computational tasks. Furthermore, it should be appreciated that the at least one second computing device can be both single hardware and/or plurality of hardware operating in a parallel or distributed architecture. In an example, the at least one second computing device may include components such as memory, a processor, a network adapter and the like, to store, process and/or share information with other computing components, such as computing device. Optionally, the at least one second computing device is implemented as a computer program that provides various services (such as database service) to other devices, modules or apparatus. The cooperation of computing device with at least one second computing device refers to a connection between the computing device and at least one second computing device to enable a communication for generation of the passwords by the at least one second computing device. Optionally, the at least one second computing device is connected to the computing device for receiving the security identifier entered by the user on the user interface of the computing device and for receiving the characteristics associated with the application selected by the user on the user interface. In an example, a user selects 'GTJ' application on the user interface, a second computing device receives a thumbprint, an iris scan and a sequence such as HRY9# as security identifier and information about version of the 'GTJ' application, software instructions used in the 'GTJ' application as characteristics associated with the 'GTJ' application. In such a case, the second computing device employs the programmable components to generate the password for the 'GTJ' application The connection between the second computing device and the computing device is via a network having an arrangement of interconnected programmable and/or non-programmable components that are configured to facilitate data communication between the second computing device and the computing device. Furthermore, the network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM).

Optionally, the password generation and management system is configured to cause the computing device to transmit to said at least one second computing device an encrypted message containing one or more parameters derived from the security identifier for the purpose of generating the passwords. Optionally, the password generation and management system can include one or more encryption protocols, such as key-agreement protocol for generating public and private keys for encrypting and decrypting message containing one or more parameters derived from the security identifier for the purpose of generating the passwords. It will be appreciated that the message encrypted by the public key can be decrypted by the private key. Optionally, the message can include disparate pieces of information such as service IDs, dates, times, format information etc from the third-party service such as Google Firebase relating to a specific service required. Thereafter, the message can be processed by the one or more computer programs or routines in real time to translate the message to generate a persistent complex password for accessing the application. Optionally, processing the message includes combining these pieces of information and calculating the relevant password.

Optionally, the password generation and management system is configured to cause the device to display, on a display of the device, a first image, and the inputting and reinputting of the security identifier involve the user interacting with the first image. Optionally, the first image comprises the user interface elements displaying graphical and/or textual information to allow the user to input and reinput the security identifier. In an example, the first image comprises a grid such that the user can select the grid and thereby input and reinput the security identifier. In such an example, the user can input a pattern on the grid. Optionally, the user interface elements are different at input of the security identifier and at reinput of the security identifier. Optionally, the first image allows the user to interact with the first image input and reinput the security identifier in tactile manner, such as through physical interaction.

Optionally, the password generation and management system may be further configured, in response to the user interacting with the first image, to cause the device to display, on the display of the device, a second image, and the inputting and reinputting of the security identifier also involve the user interacting with the second image. The second image comprises the user interface elements displaying graphical and/or textual information to allow the user to input and reinput the security identifier. The second image enables re-entering of the security identifier for confirming a correct input of the security identifier for the first application and a correct reinput of the security identifier for the second application. Optionally, the first and second images are the same. Furthermore, the user interface elements displayed on the first image and the second image may be the same. In an example, the user interface elements of both the first image and second image comprise displaying a grid structure (such as matrix or lattice) to receive a security identifier, a name and icon of the application, name of developer of the application and information related to usage of the application. Moreover, a visual appearance of the first image and the second image may be the same. In an example, a grid of numbers for receiving a security identifier in the first image may have a font size: 10, a text font: Verdana, a text colour: black, a background colour of text: white whereas, a grid of numbers for receiving a security identifier in the second image may have a font size: 12, a text font: Verdana, a text colour: white, a background colour of text: black. Optionally, the password generation and management system may be further configured, in response to the user interacting with the first image and the second image, to cause the device to display, on the display of the device, additional images (for example, a third image, a fourth image and the like). It is to be understood that the number of images displayed for the first application, the second application and each of the other applications of the plurality of applications are same. In an example, a first image, a second image, and a third image are displayed for the first application, second application, third application and the fourth application.

Optionally, the first or second image includes an array of items, or a lattice. The array of items or the lattice involves a specific arrangement of elements or items on the first and second images. The term lattice herein refers to an arrangement of nodes comprising characters, numbers, and symbols or their combination enabling the user interface to acquire the security identifier (such as a pattern) from the user. Optionally, the arrangement of the array of items or the lattice on the first image or the second image is modified by the user entering the security identifier. In an example, the lattice comprises a grid of 6 nodes comprising two rows and three columns such that a first row comprises alphabet 'A', number '2', and symbol '$' and a second row comprises number '5', alphabet 'B' and number '8'.

Optionally, the password generation and management system is configured to recognise one or more patterns produced on the first or second image as the security identifier or as an element of the security identifier. Optionally, the user interacts with the first image or the second image for inputting and reinputting the security identifier by entering patterns such as a 'T' shaped pattern, and/or fingerprints or thumbprint and/or numbers and/or alphanumeric characters and/or movement patterns and the likes. The aforesaid one or more patterns are recognized by the password generation and management system as the security identifier.

The given password is provided to the particular application to make that given password the respective password for that particular application. The given password refers to the password that is generated by the password generation and management system for an application of the plurality of applications, such as the first password for the first application, the second password for the second application, the other unique passwords for other applications of the plurality. Particularly, providing the password to the particular application refers to allowing the particular application to access the password to set that password as the password enabling access to the protected functionality provided by the particular application to the user accessing it. On first using the password generation and management system for an application for which the user already had a password allocated, the new password generated by the password generation and management system is provided to that application to replace the existing application password as the respective password giving access to that application's protected functionality.

Optionally, the password generation and management system is configured at the initial stage to make the passwords available to the user for the user to copy to the respective application. Optionally, the user upon inputting the security identifier receives a prompt message comprising the password generated by the password generation and management system for the application selected by the user. Furthermore, the user provides the password to the particular application. Optionally, the display of the device comprises a third image which enables the user to provide the given password to application selected by the user. The third image comprises an input element (such as a text box) wherein the user can enter the password. Furthermore, the input element is linked to the application selected by the user. Beneficially, the third image is displayed after the first and second images are displayed on the display of the device. Optionally, the password generation and management system are also configured at the initial stage to provide the passwords to the first and second applications directly.

The password generation and management system may be operable to provide the respective password for access to the protected functionality of the particular application in response to the user selecting the particular application and the further inputting of the security identifier, without comparing the security identifier whose input resulted in the original generation of the respective password for that particular application with the security identifier which the user provided by the further inputting. The password generation and management system does not store the security identifier and hence is not able to make a comparison between security identifiers input at different times. Instead, the password generation and management system may accept any security identifier that is input (subject to the input satisfying any requirements as to acceptable format for a security identifier as established for a given instance of the password generation and management system), and generate a password based on the selection of a respective application. If the security identifier that is input is sufficiently similar to the security identifier that was initially input to generate the password established for access to the protected functionality of that application, the password generation and management system will once again generate the same password, enabling the user to gain access to the protected functionality of the relevant application. But if the security identifier that is provided is insufficiently similar to the security identifier that resulted in the original generation of the respective password, the password generation and management system will instead generate a different password—and the different password will not enable the user to gain access to the protected functionality of the relevant application. The user interface of the computing device prompts the user to select the particular application and further input the security identifier to access the protected functionality of the particular application. In an example, the user interface provides a first set of one or more user interfaces wherein the user may select the first application. Furthermore, upon selecting the first application the user interface provides a second set of one or more user interfaces that enables the user to input the security identifier for accessing the first application.

Optionally, the password generation and management system is also configured at the subsequent stage to make the password available to the user for the user to copy to the first application. Optionally, the user upon further inputting the security identifier receives a prompt note comprising the freshly generated password generated by the password generation and management system for the first application selected by the user. Furthermore, the user provides the freshly generated password to the first application. Optionally, the display of the device comprises an input box where the user can enter the freshly generated password. Furthermore, the input box is linked to the first application selected by the user. Optionally, the password generation and management system is configured at the subsequent stage to provide the password to the first application directly. The freshly generated password upon generation by the password generation and management system is provided directly to the application. The password generation and management system are configured to generate the freshly generated password for the particular application at the further inputting stage whether or not the security identifier input by the user at the further inputting stage corresponds to that entered at the initial stage. The password generation and management system include one or more computer program or routine that is configured to generate the freshly generated password for the particular application upon receiving the security identifier input by the user via the user interface (without verifying if the security identifier is authentic for the particular application). In an example, the one or more computer program or routine may be a random code generator that generates afresh password for the first application upon receiving the security identifier as an input.

Furthermore, access to the protected functionality of the particular application is only given in an event that the freshly generated password provided to the particular application matches the password generated at the initial stage. The freshly generated password is provided by the password generation and management system to the application programming interface of the particular application. In an example, when a freshly generated password of the first application matches the first password generated at the initial stage, the user is granted access to the protected functionality of the first application. In another example, when a freshly generated password of the first application doesn't match the first password generated at the initial stage, the user is prevented from accessing the protected functionality of the first application.

Additionally, the freshly generated password of the particular application matches the unique password of the particular application if the security identifier input by the user at the further inputting stage does correspond to that entered at the initial stage. Specifically, the one or more computer program or routine that is configured to generate the freshly generated password that matches to the unique password of the particular application in the event wherein the user enters the security identifier that corresponds to the initial security identifier initially provided by the user for the particular application during the initial stage. Beneficially, such operational architecture of the computing device makes the computing device secure (for example, immune from brute force attacks).

According to an embodiment, the present invention also provides a password generation and management system for managing password access to a plurality of applications executable on a computing device, each of the applications requiring entry of a respective password for access to protected functionality of the respective application; the password generation and management system being operable to: generate a first password for a first application of the plurality of applications based on a user selection of the first application and the inputting of a security identifier by a user; generate a second password for a second application of the plurality of applications based on a user selection of the second application and a reiteration of the security identifier obtained as the result of a reinputting of the identifier by the user through the user interface, the first and second passwords being different from each other; and similarly to generate a unique password for each of the other applications of the plurality of applications based on their individual selection and a distinct reinputting of the security identifier for each password generation event; and after a given password has been provided to a particular application to make that given password the respective password for that particular application, the password generation and management system being operable to: provide the respective password for access to the protected functionality of the particular application in response to the user selecting the particular application and a further inputting of the security identifier, without comparing the security identifier whose input resulted in the original generation of the respective password for that particular application with the security identifier which the user provided by the further inputting.

DETAILED DESCRIPTION OF THE DRAWINGS

Referring to FIG. 1, there is provided a block diagram of a computing device 100, in accordance with an embodiment of the present invention. As shown, the computing device 100 includes a user interface 102 and a memory 104. Furthermore, the memory 104 stores a plurality of applications executable on the computing device, and a password generation and management system 106. Additionally, each of the applications of the plurality of applications requires entry of a respective password for access to protected functionality of the respective application. Additionally, the password generation and management system manage password access to the plurality of applications.

Figure 2:
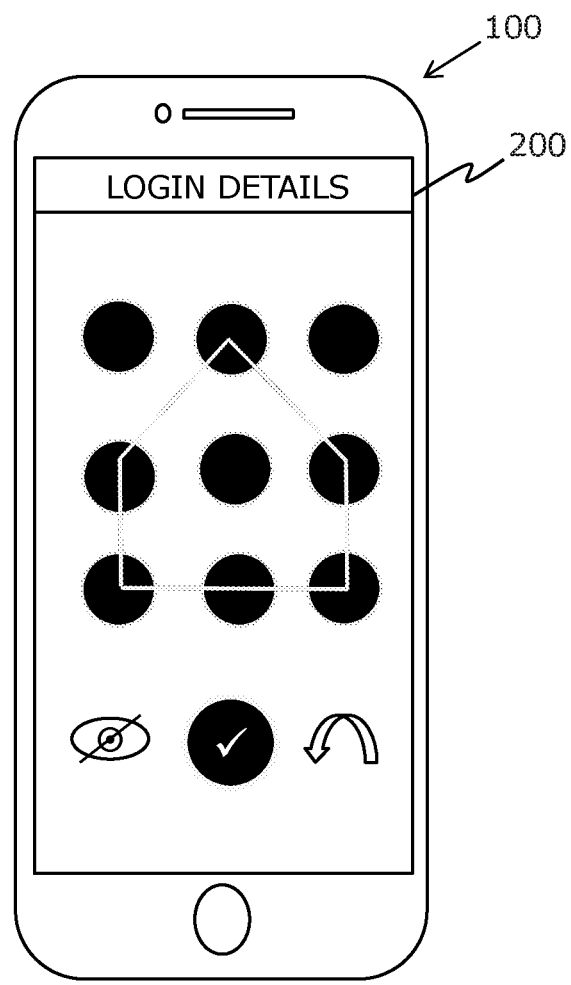
FIG. 2 is a schematic illustration of the computing device of FIG. 1, associated with a user having an exemplary user interface, in accordance with an embodiment of the present invention.

Referring to FIG. 2, is a schematic illustration of the computing device 100 of FIG. 1, associated with a user, and having an exemplary user interface 200, in accordance with an embodiment of the present invention. As shown, the user interface 200 acquires security identifier from the user in form of a representation of a house using five strokes, two angled ones at the top of the pattern representing a pitched roof, linked to two parallel vertical strokes to represent the walls of the house, and a final horizontal stroke representing the floor of the house.

Figure 3:
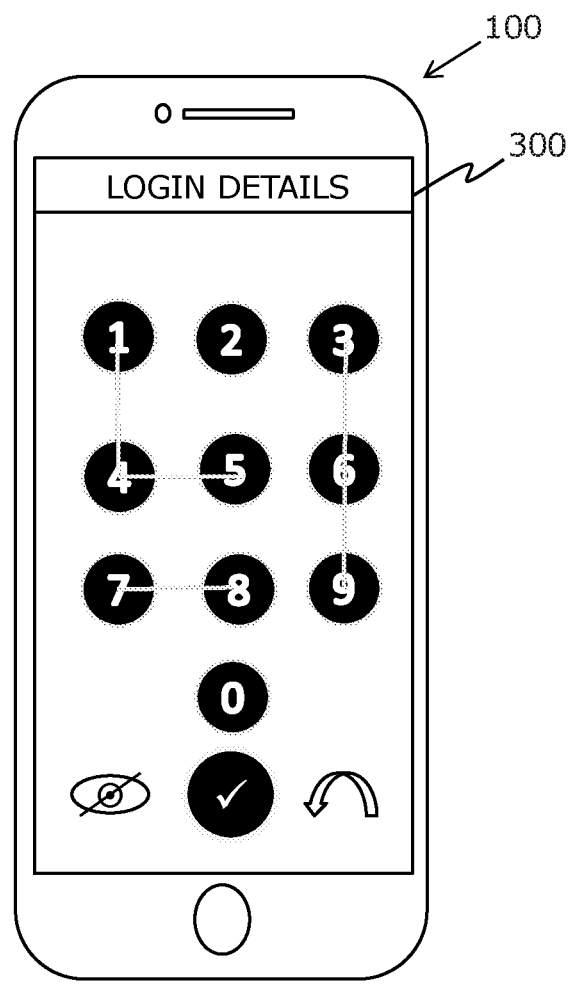
FIG. 3 is a schematic illustration of the computing device of FIG. 1, associated with a user having an exemplary user interface, in accordance with another embodiment of the present invention.

Referring to FIG. 3, is a schematic illustration of the computing device 100 of FIG. 1, associated with a user, and having an exemplary user interface 300, in accordance with another embodiment of the present invention. As shown, the user interface 300 acquires a security identifier from the user—in this case a pattern of input strokes linking various digits set out in a lattice on a display of the device. Furthermore, the characters other than digits, or in addition to digits, such as letters or other symbols (such as mathematical, scientific, geometric shapes, etc.) can be used in such a lattice. Additionally, the lattice may be based on any suitable shape, e.g. square, circle, diamond, triangle, trapezium, etc. The idea behind using such an interface is to enable a user to produce a repeatable and memorable pattern having nodes, corners, points of inflection, at known and well-defined locations. For example, a user might draw a stylised representation of a house using five strokes, two angled ones at the top of the pattern representing a pitched roof, linked to two parallel vertical strokes to represent the walls of the house, and a final horizontal stroke representing the floor of the house. But, just as when writing a Japanese, Thai, or Chinese character, the order and direction of the individual strokes may also be of significance—so that a pattern may be captured as a given sequence of strokes, with each stroke having a correct direction. Moreover, the system may be arranged so that the junctions between the strokes have to coincide with given ones of the symbols of the displayed lattice. Additionally, the user interface 300 enables the user to input security identifier that may include a fingerprint, thumbprint, an iris scan, or other biometric input. Furthermore, the security identifier may be a multi-level pattern key. Moreover, user interface 300 enables inputting and re-inputting of the security identifier by the user.

Figure 4:
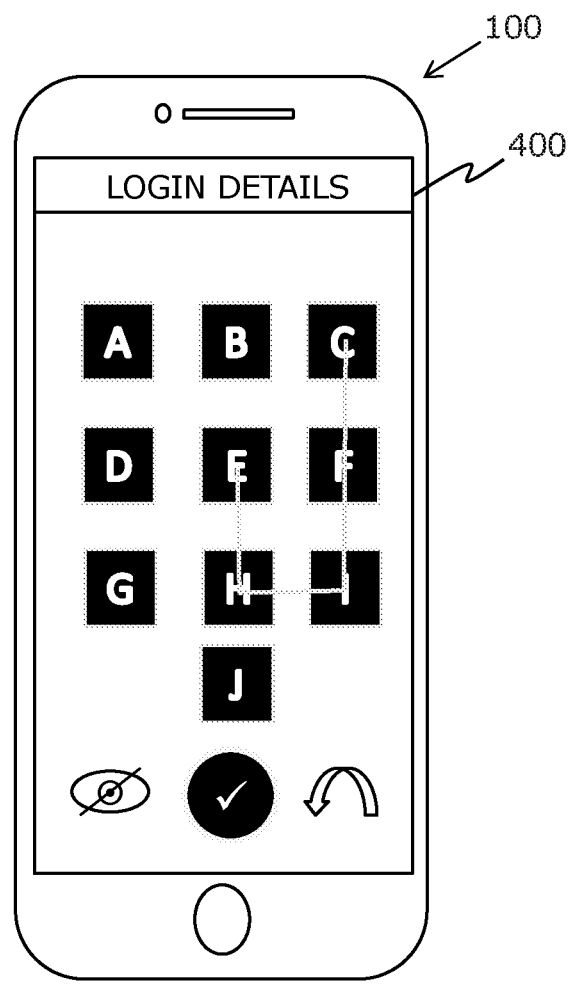
FIG. 4 is a schematic illustration of the computing device of FIG. 1, associated with a user having an exemplary user interface, in accordance with yet another embodiment of the present invention.

Referring to FIG. 4, is a schematic illustration of the computing device 100 of FIG. 1, associated with a user, and having an exemplary user interface 400, in accordance with yet another embodiment of the present invention. As shown, the user interface 400 acquires security identifier from the user in form of a pattern of input strokes linking various alphabets in a lattice on a display of the device. Additionally, the lattice is based on square shape. Furthermore, the security identifier may be a multi-level pattern key. Moreover, user interface 400 enables inputting and re-inputting of the security identifier by the user.

Figure 5:
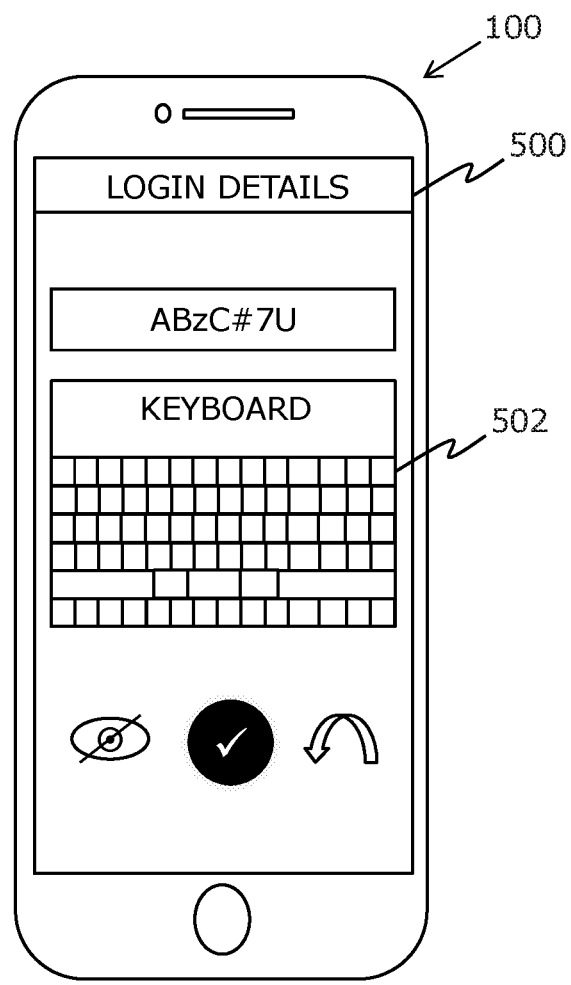
FIG. 5 is a schematic illustration of the computing device of FIG. 1, associated with a user having an exemplary user interface, in accordance with still another embodiment of the present invention.

Referring to FIG. 5, is a schematic illustration of the computing device 100 of FIG. 1, associated with a user, and having an exemplary user interface 500, in accordance with still another embodiment of the present invention. As shown, the user interface 500 acquires security identifier from the user in form of a sequence of characters (denoted as ABzC#7U). The user inputs the sequence of characters via a touch screen keyboard 502 on the computing device.

Figure 6:
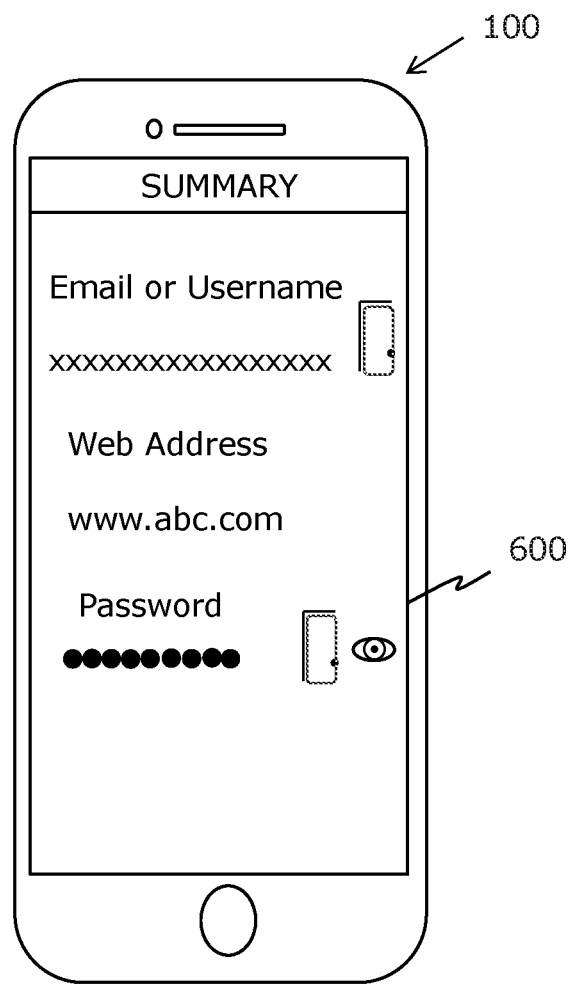
FIG. 6 is a schematic illustration of the computing device of FIG. 1, associated with a user having an exemplary user interface, in accordance with an embodiment of the present invention.

Referring to FIG. 6, illustrated is a schematic illustration of the computing device 100 of FIG. 1, associated with a user, and having an exemplary user interface 600, in accordance with an embodiment of the present invention. As shown, the user interface 600 includes a plurality of user interface elements to acquire and provide data associated with the user. In an example, a user interface element can be an input field to acquire the email address of the user, another user interface element can be an input field to acquire the web address of an application, and yet another user interface element can be an input field to provide the user with the password for accessing the services of the application.

Figure 7:
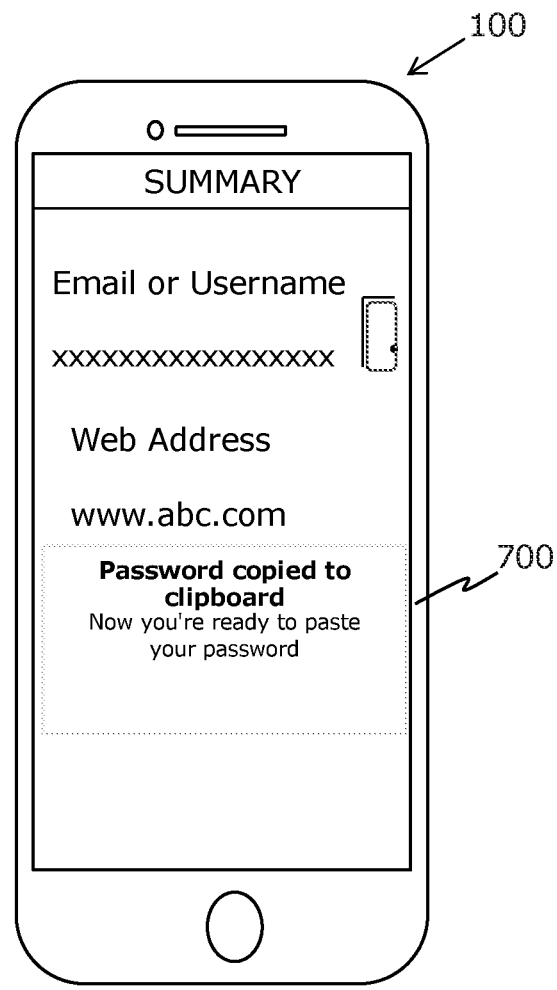
FIG. 7 is a schematic illustration of the computing device of FIG. 1, associated with a user having an exemplary user interface, in accordance with an embodiment of the present invention.

Referring to FIG. 7, illustrated is a schematic illustration of the computing device 100 of FIG. 1, associated with a user, and having an exemplary user interface 700, in accordance with an embodiment of the present invention. As shown, the user interface 700 is a pop-up window or push message that can be displayed over the user interface 700 including a plurality of user interface elements to acquire and provide data associated with the user. Furthermore, the user interface 700 may provide the user with information related to the password for accessing the application.

Figure 8A:
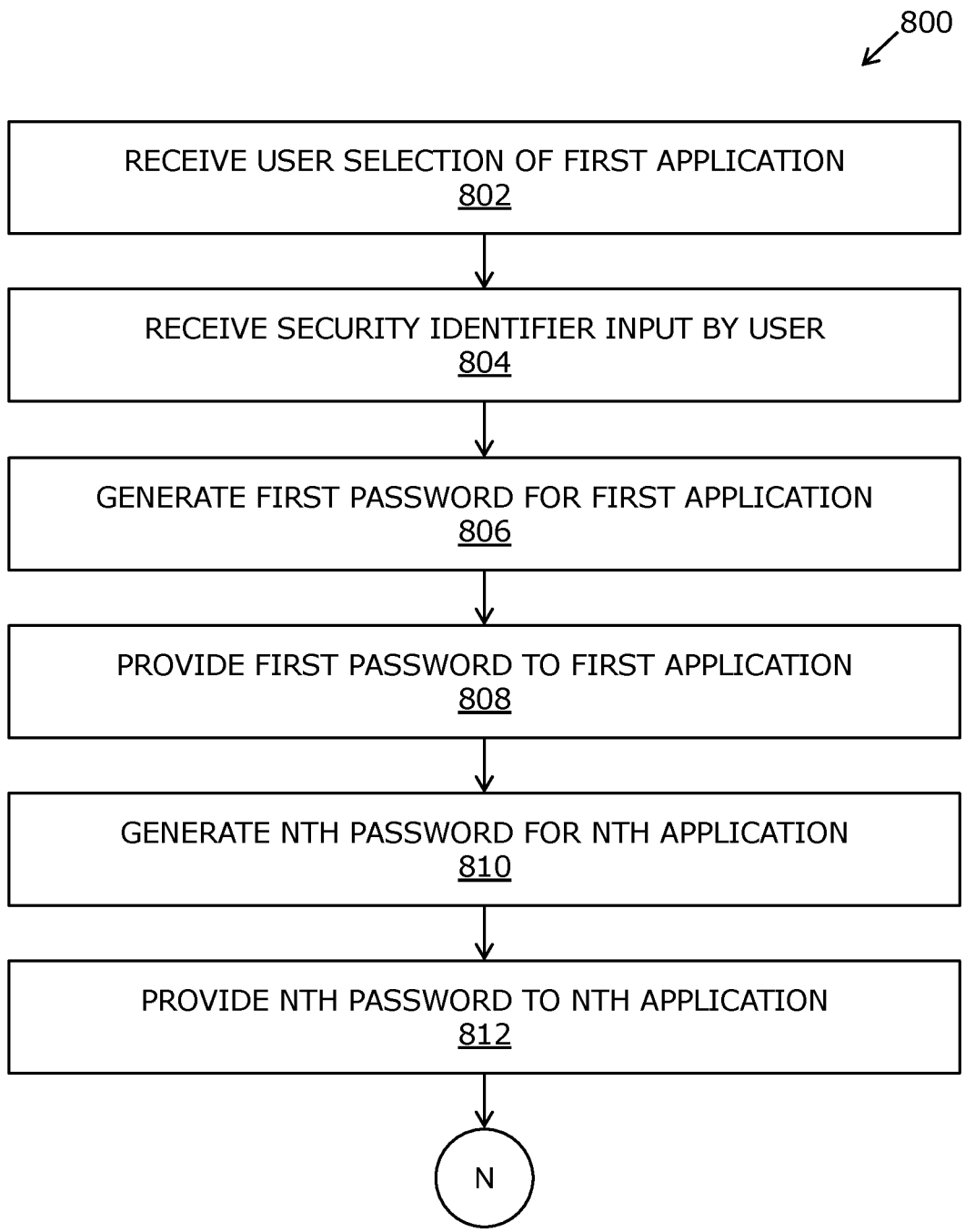
FIG. 8A-B illustrate steps of a method of controlling access to protected functionality of applications on a computing device, in accordance with an embodiment of the present invention.
Figure 8B:
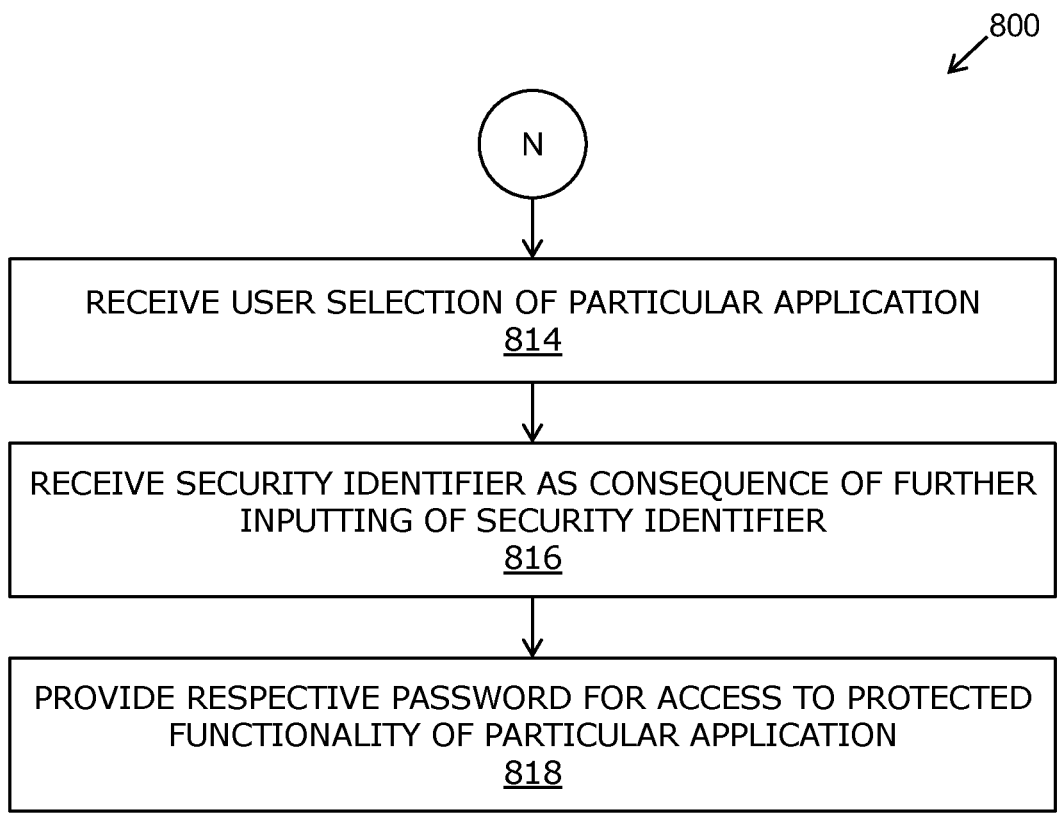

Referring to FIG. 8A-B illustrated are steps of a method 800 of controlling access to protected functionality of applications on a computing device, in accordance with an embodiment of the present invention. At a step 802, a user selection of a first application of the plurality of applications is received. At a step 804, a security identifier input by the user is received through the user interface. At a step 806, a first password for the first application is generated using the password generation and management system, based on the user selection of the first application and the inputting of the security identifier. At step 808, the first password is provided to the first application to make the first password the respective password for the first application. At step 810, an nth password for an nth application of the plurality of applications is generated using the password generation and management system, based on receiving a user selection of the nth application and a reiteration of the security identifier obtained as the result of a reinputting of the security identifier by the user through the user interface. Furthermore, the first and nth passwords are different from each other. At step 812, the nth password is provided to the nth application to make the nth password the respective password for the nth application. At step 814, after a given password has been provided to a particular application to make that given password the respective password for that particular application a user selection of the particular application is received. At step 816, the security identifier is received as a consequence of a further inputting by the user of the security identifier. At step 818, the respective password for access to the protected functionality of the particular application is provided without comparing the security identifier whose input resulted in the original generation of the respective password for that particular application with the security identifier which the user provided by the further inputting.

The steps 802 to 818 are only illustrative and other alternatives can also be provided where one or more steps are added, one or more steps are removed, or one or more steps are provided in a different sequence without departing from the scope of the claims herein. In an example, the password generation and management system provide at the subsequent stage the password to the first application directly. In another example, the password generation and management system provide at the initial stage the passwords to the first and second applications directly. In yet another example, at the initial stage the password generation and management system make available the passwords to the user for the user to copy to the respective application. In another example, at the subsequent stage the password generation and management system make the password available to the user for the user to copy to the first application. In yet another example, the password generation and management system cause the device to display, on a display of the device, a first image, and wherein the inputting and re-inputting of the security identifier involve the user interacting with the first image. In another example, the password generation and management system cause, in response to the user interacting with the first image, the device to display, on the display of the device, a second image, and wherein the inputting and re-inputting of the security identifier also involve the user interacting with the second image. In yet another example, the first and second images are the same. In another example, the first or second image includes an array of items, or a lattice. In yet another example, the method includes recognising using the password generation and management system one or more patterns produced on the first or second image as the security identifier or as an element of the security identifier. In another example, the password generation and management system accepts a fingerprint, thumbprint, an iris scan, or other biometric input as the security identifier or as an element of the security identifier. In yet another example, the method comprises generating the respective password of each of the plurality of applications with the password generation and management system. In another example, the password generation and management system of the device cooperates with at least one second computing device in order to generate the passwords. In yet another example, the method comprises transmitting to said at least one second computing device an encrypted message containing one or more parameters derived from the security identifier for the purpose of generating the passwords. In another example, the security identifier is a multi-level pattern key.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A method of controlling access to protected functionality of applications on a computing device, the computing device comprising a user interface and a memory, the memory storing:
a plurality of applications executable on the computing device, each of the plurality of applications requiring entry of a respective password for access to protected functionality of a respective application;
a password generation and management system for managing password access to the plurality of applications;
the method comprising an initial stage of:
receiving a user selection of a first application of the plurality of applications;
receiving a security identifier input by the user through the user interface;
generating, using the password generation and management system, a first password for the first application based on the user selection of the first application, one or more characteristics associated with the first application, and the inputting of the security identifier;
providing the first password to the first application to make the first password the respective password for the first application;
generating, using the password generation and management system, an nth password for an nth application of the plurality of applications upon receiving a user selection of the nth application, one or more characteristics associated with the nth application, and a reiteration of the security identifier obtained as the result of a reinputting of the security identifier by the user through the user interface, the first and nth passwords being different from each other;
providing the nth password to the nth application to make the nth password the respective password for the nth application;
and, at a subsequent stage, after a given password has been provided to a particular application to make that given password the respective password for that particular application:
receiving a user selection of the particular application;
receiving the security identifier as a consequence of a further inputting by the user of the security identifier; and
providing the respective password for access to the protected functionality of the particular application without comparing the security identifier whose input resulted in the original generation of the respective password for that particular application with the security identifier which the user provided by the further inputting,
wherein the computing device is configured to accept the security identifier in the form of a signature captured in a digital form when a pattern is made on the user interface
the method further comprising subsequently:
providing the user with access to the protected functionality of the first application as a consequence of the user:
selecting the first application;
further inputting the security identifier through the user interface;
generating afresh, using the password generation and management system, a password for the first application based on the user's selecting the first application and the further inputting of the security identifier, without determining whether or not the security identifier input by the user at the further inputting stage corresponds to that entered at the initial stage;

providing the freshly generated password to the first application; and providing access to the protected functionality of the first application when the freshly generated password provided to the first application matches the first password, wherein the freshly generated password is provided to the first application matching the first password when the security identifier input by the user at the further inputting stage corresponds to that entered at the initial stage.

2. The method of claim 1, including the password generation and management system providing, at the subsequent stage, the first password to the first application directly.

3. The method of claim 2, including the password generation and management system providing, at the initial stage, the first password and the nth passwords to the first and nth applications directly, respectively.

4. The method of claim 1, including at the initial stage the password generation and management system making available the respective passwords to the user for the user to copy to the respective application.

5. The method of claim 4, including at the subsequent stage the password generation and management system making the first password available to the user for the user to copy to the first application.

6. The method of claim 1, further including the password generation and management system causing the device to display, on a display of the device, a first image, and wherein the inputting and reinputting of the security identifier involve the user interacting with the first image.

7. The method of claim 6, further including the password generation and management system causing, in response to the user interacting with the first image, the device to display, on the display of the device, a second image, wherein the inputting and reinputting of the security identifier also involve the user interacting with the second image.

8. The method of claim 7, wherein the first and second images are the same.

9. The method of claim 7, wherein the first or second image includes an array of items, or a lattice.

10. The method of claim 7, further including recognising one or more patterns produced on the first or second image as the security identifier or as an element of the security identifier.

11. The method of claim 1, further including the password generation and management system accepting a fingerprint, thumbprint, an iris scan, or other biometric input as the security identifier or as an element of the security identifier.

12. The method of claim 1, further including generating the respective password of each of the plurality of applications with the password generation and management system.

13. The method of claim 1, further including the password generation and management system of the device cooperating with at least one second computing device in order to generate the passwords.

14. The method of claim 13, further including transmitting to said at least one second computing device an encrypted message containing one or more parameters derived from the security identifier for the purpose of generating the passwords.

15. The method of claim 1, wherein the security identifier is a multi-level pattern key.

16. The method of claim 1, wherein the one or more characteristics of the first and nth application include a version of the application, software instructions used in the application and/or software coding language used in the application.

17. A non-transitory computer readable medium configured to store instructions which, when executed by a processor, cause the processor to perform the method of claim 1.

18. A computing device including a user interface and a memory, the memory storing:

a plurality of applications executable on the computing device, each of the plurality of applications requiring entry of a respective password for access to protected functionality of a respective application;

a password generation and management system for managing password access to the plurality of applications;

wherein the password generation and management system is configured to:

at an initial stage:
receive a user selection of a first application of the plurality of applications;

receive a security identifier input by the user through the user interface;

generate, using the password generation and management system, a first password for the first application based on the user selection of the first application, one or more characteristics associated with the first application, and the input of the security identifier;

provide the first password to the first application to make the first password the respective password for the first application;

generate, using the password generation and management system, an nth password for an nth application of the plurality of applications based on receiving a user selection of the nth application, one or more characteristics associated with the nth application, and a reiteration of the security identifier obtained as the result of a reinput of the security identifier by the user through the user interface, the first and nth passwords being different from each other;

provide the nth password to the nth application to make the nth password the respective password for the nth application;

and, at a subsequent stage, after a given password has been provided to a particular application to make that given password the respective password for that particular application:

receive a user selection of the particular application;

receive the security identifier as a consequence of a further input by the user of the security identifier; and, provide the respective password for access to the protected functionality of the particular application without comparing the security identifier whose input resulted in the original generation of the respective password for that particular application with the security identifier which the user provided by the further input, wherein the computing device is configured to accept the security identifier in the form of a signature captured in a digital form when a pattern is made on the user interface at further stage subsequently:
providing the user with access to the protected functionality of the first application as a consequence of the user:

selecting the first application;

further inputting the security identifier through the user interface;

generating afresh, using the password generation and management system, a password for the first application based on the user's selecting the first application and the further inputting of the security identifier, without determining whether or not the security identifier input by the user at the further inputting stage corresponds to that entered at the initial stage;

provide the freshly generated password to the first application; and provide access to the protected functionality of the first application when the freshly generated password provided to the first application matches the first password, wherein the freshly generated password is provided to the first application matching the first password when the security identifier input by the user at the further inputting stage corresponds to that entered at the initial stage.

\* \* \* \* \*